United States Patent [19]

Kato

[11] Patent Number: 5,107,597
[45] Date of Patent: Apr. 28, 1992

[54] MAGNETIC COMPASS

[76] Inventor: Takeshi Kato, 2-9-9 Shibazaki-cho, Tachikawa, Tokyo, Japan, 190

[21] Appl. No.: 573,058

[22] Filed: Aug. 24, 1990

[30] Foreign Application Priority Data

Aug. 24, 1989 [JP] Japan ............................. 1-98780[U]
Dec. 12, 1989 [JP] Japan ............................. 1-142808[U]
Mar. 5, 1990 [JP] Japan ............................. 2-21550[U]

[51] Int. Cl.$^5$ ............................. G01C 17/08
[52] U.S. Cl. ............................. 33/355 R; 33/364; 33/327; 33/DIG. 2
[58] Field of Search ............................. 33/355 R, 364, 356, 33/357, 358, 346, 345, DIG. 2, 316, 327, 363 Y, 319

[56] References Cited

U.S. PATENT DOCUMENTS

| | | | |
|---|---|---|---|
| 1,309,637 | 7/1919 | Klahn | 33/327 |
| 2,087,086 | 7/1937 | De Beeson | 33/363 Y |
| 2,098,564 | 11/1937 | Carter et al. | 33/316 |
| 3,068,583 | 12/1962 | Goshen | 33/364 |
| 3,128,562 | 4/1964 | Yusa | 33/364 |
| 3,956,831 | 5/1976 | Sibley | 33/364 |
| 4,359,823 | 11/1982 | White | 33/355 R |
| 4,667,414 | 5/1987 | Russell | 33/364 |
| 4,930,224 | 6/1990 | LeBlanc | 33/355 D |

*Primary Examiner*—William A. Cuchlinski, Jr.
*Assistant Examiner*—William C. Dowling
*Attorney, Agent, or Firm*—Wenderoth, Lind & Ponack

[57] ABSTRACT

A magnetic compass has an instrument body adapted to be held level by a gimbal mechanism and having a vertical cylinder member, a spherical or semi-spherical float body on the upper end of the cylinder member and having a spherical surface facing downwardly into the upper end of the cylinder member, a magnet at a bottom center of the float body for making the center of gravity of the float body near the bottom center of the float body, a graduated azimuth scale on the float body, a lubber's line indicator on the surface of the instrument body surrounding the float body, and an air blowing device operatively associated with the cylinder member for blowing rectified air upward through the inside of the cylinder member with a force sufficient for making the float body float stably on the upper end of the cylinder member and out of contact therewith for enabling the float body to freely turn in response to geomagnetic force.

9 Claims, 5 Drawing Sheets

MAGNETIC COMPASS

BACKGROUND OF THE INVENTION

The present invention relates to an improved magnetic compass for marine and/or land use which has a semispherical or spherical float body with an appropriate size magnet attached to the bottom center thereof floated stably and freely inwardly of an inner circumference of a cylindrical instrument body by a rectified air current blown upwardly through the inside of an inner cylinder of said cylindrical instrument body, whereby an azimuth pointer on the surface of said semispherical or spherical float body is freely movable to indicate the geomagnetic North direction.

Magnetic compasses can generally be divided into two categories based on structural feature: one is a dry type and the other is a liquid type. Most conventional dry type compasses are inferior in the ability to move freely to the liquid type compasses because the vibration absorbing mechanism thereof is imperfect, and as a consequence such compasses are almost completely out of use at present. For this reason, liquid type compasses have become popular. A typical conventional liquid type compass is illustrated in FIG. 5 and will be described for purposes of comparison.

In FIG. 5, reference numeral 1 designates a float provided with a magnetic pointer which is freely swingably pivoted on a cap 4 by means of a pivot 3 on the central axis of the instrument body 8. Reference numeral 2 designates a compass card with a graduated azimuth scale thereon and fixed on the float 1. Reference numeral 5 designates the lubber's line plate which indicates the bow direction of a vessel and is attached to the instrument body 8. Reference numeral 9 designates a cover for the instrument body and is made of a transparent glass. The inside of the instrument body 8 is filled with a body of liquid in order to prevent the compass card from vibrating. Numeral 6 designates a regulator to properly compensate for the expansion and contraction of the liquid caused by a change of temperature. Numeral 7 designates a lead ballast to stabilize the instrument body 8 by providing weight in its bottom portion.

Although the conventional liquid type compasses generally comprise such elements, most of them have the following drawbacks:

1) When the helm of a vessel carrying such a compass is put hard port or starboard, the liquid inside the instrument body 8 comes out a concomitant movement which causes the float 1 and the compass card 2 to turn together with the ship's turning motion. As a result, the compass cannot indicate correctly a new bow direction immediately after the turning operation.

2) There is a possibility that the compass card 2 will become discolored after long periods of use.

3) In an extremely cold region, there may be times when the liquid will freeze.

4) In the tropics, there may be cases where the glass cover 9 breaks due to the expansion of the liquid, or the liquid decomposes due to the heat.

5) The method of correcting a possible variation between the azimuth scale and the actual indication by the pointer is carried out by adjusting an iron ball on the outside. However, this adjustment requires considerable labor because the structure is large and heavy.

6) The indication mechanism has an intricate structure and is heavy, so that the gimbal for supporting the compass mechanism becomes large and massive. This results in an increase in the production cost, and there is no increase in the followability of the compass proportional to the increase in the production cost.

SUMMARY OF THE INVENTION

It is therefore a general object of the present invention to overcome the above-described drawbacks of the prior art devices and to provide an improved magnetic compass having such features as simplicity in structure, superb followability of the geomagnetic direction, ease of operation, lighter weight, moderate price, etc.

More specifically, it is an object of this invention to provide a new magnetic compass characterized in that a semispherical or spherical float body with a magnet attached to the bottom center thereof is floated freely inwardly of an inner circumference of an instrument body by an air current blown upward through the inside of an inner cylinder thereof so as to be freely movable to indicate the geomagnetic North direction by the action of said magnet.

Also, it is an object of the invention to overcome the problem of imperfect vibration absorption inherent in the dry type compass by floating the float body in the air current and at the same time to overcome the problem resulting from the structure of the liquid type compass by using the air current instead of a liquid, and to provide a new compass having such features as superior followability, a simpler structure, lighter weight and moderate price as compared with conventional compasses.

Another object of this invention is to provide a unique compass in which a magnet member is fixed as a balance weight on the bottom center of the float body in order to bring its center of gravity near the bottom center and to cause the float body to float in an upright posture while in the floating state.

A further object is to provide a unique compass characterized in that the float body can be held stably in the upper part of the instrument body by a rectified air current blown upward through the inside of an inner cylinder of the cylindrical instrument body in parallel thereto from an air blowing source.

Yet another object is to provide a unique compass in which the upper head portion of the cylindrical instrument body, whereat the semispherical or spherical float body is contactlessly floated, is slightly widened in order to facilitate exhaust of the air current flowing through the clearance between said portion and the float body and at the same time to improve the stabilization of the floating condition.

A further object is to provide a unique compass in which the scale arrangement is ergonomically made to facilitate observation because the azimuth scale is provided on the surface of the float body suspended in an upright stable posture and the lubber's line is likewise provided on the surface of the instrument body in which the float body is housed and kept practically at a level by means of a gimbal mechanism.

A still further object is to provide a structurally simplified magnetic compass in which an electric fan is provided at an internal lower portion of the cylindrical instrument body as a means for supplying the air for floating the float body and also an air rectifying means is arranged inside the cylindrical instrument body in order to cause the air current to flow upward in parallel to the vertical axis thereof.

A yet further object is to provide a more simplified magnetic compass from which the above-described electric fan and rectifying means are omitted by supplying a non-turbulent air flow into the cylindrical instrument body through a flexible tube from an outside air source.

A still further object is to provide a magnetic compass in which the measurement accuracy is reasonably enhanced by incorporating a simple means therein for making it possible to correct a variation between the azimuth scale on the compass card of the semispherical float body and the actual direction of geomagnetic North.

Other objects and advantages will become apparent from the following description taken in connection with the accompanying drawings.

DETAILED DESCRIPTION OF THE INVENTION

Figure 1:
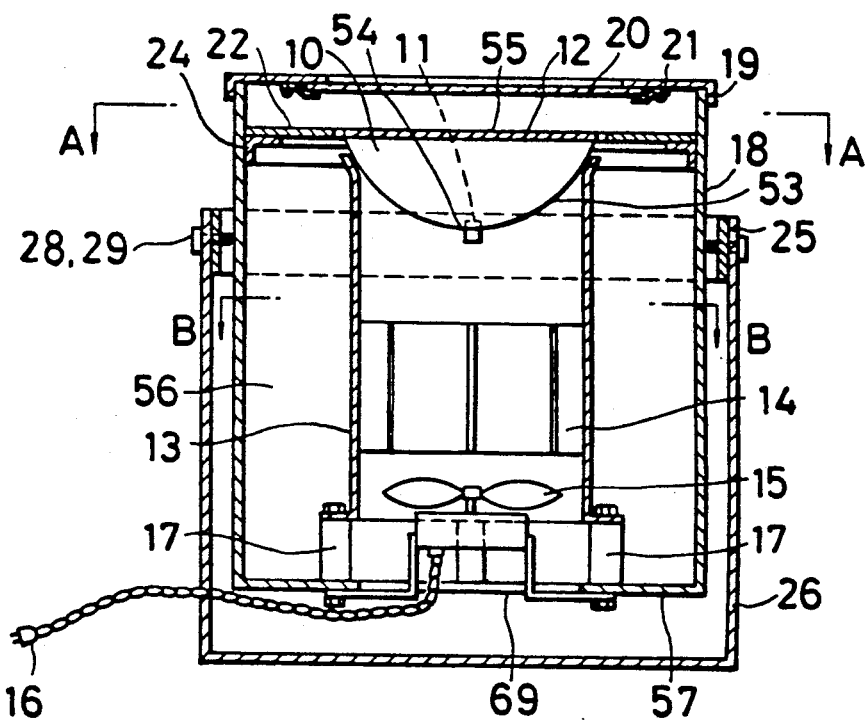
FIG. 1 is a cross-sectional elevation view of a magnetic compass according to a first embodiment of the present invention.

In the following, some preferred embodiments according to the present invention will be described with reference to the respective drawings. The present invention, however, should be understood as not being limited only to these embodiments, but rather it should be recognized that numerous variations may be made therein, unless those depart from the spirit and scope of this invention.

First Embodiment

The magnetic compass according to the first embodiment of this invention is illustrated in FIGS. 1-4. Reference numeral 10 designates a semispherical float body made of a light material (e.g. foamed polyethylene) and it is preferable to make it a hollow body. At a bottom center 54 of the spherical bottom surface 53 of the float body 10 is mounted a magnet 11 which causes the center of gravity of the float body to be lowered and brought near the bottom center 54 of the float body. The magnet 11 will accordingly act on the float body 10 as a balance weight while the float body is floating. This serves to suspend the float body 10 so that the magnet 11 attached at the bottom center 54 is just beneath the center of gravity.

Also, the magnet 11 works as a magnetic pointer to respond to geomagnetism because it is attached to the float body in a horizontal state. On a flat upper portion 55 of the semispherical float body 10 is mounted a compass card 12 with a graduated azimuth scale thereon. Reference numeral 56 designates a cylindrical instrument body which is comprised of an outer cylinder 18 forming an outer shell and a bottom plate 57 having a hole 69 at its center part, and an inner cylinder 13. Reference numeral 19 designates a cover for the instrument body 56. A transparent glass plate 20 is secured under a round hole formed at the center of the cover 19 by means of presser screws 21. This makes it possible to see, through the glass, the compass card 12 on the flat upper portion 55 of semispherical float body 10 floating on the inner cylinder 13 in the center of the instrument body 56.

Four round-shaped supporting rods 17 are positioned around the hole 69 formed in the bottom plate 57 of the instrument body 56. The inner cylinder 13 is mounted on the supporting rods 17 such that its central axis coincides with the central axis of the instrument body 56. An electric fan 15 is arranged over the hole 69 so as to be located beneath the inner cylinder 13, and when operated, it blows an air current upward through the inner cylinder 13.

Inside the inner cylinder 13 is an air rectifying means 14 which is comprised of eight vertical plates, each extending radially at an angle of 45° to the next adjacent plates. This air rectifying means 14 acts to rectify a turbulent air flow from the electric fan 15 and to change it to a parallel current flow and to float the semispherical float body 10 stably on the inner cylinder 13 out of contact therewith. The thus floated semispherical float body 10 turns to follow the geomagnetic North direction with good response to turning of the compass. The air rectifying means 14 can be any structure which will rectify the flow, for instance, a plurality of slender pipes in a bundle and positioned vertically in the inner cylinder 13.

Figure 4:
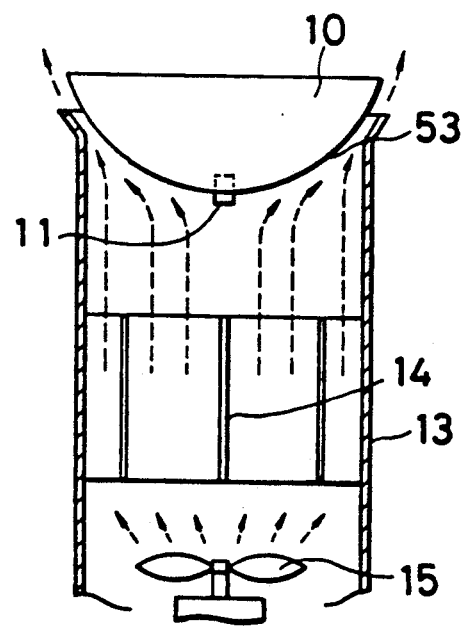
FIG. 4 is a vertical sectional view of a principal part of the compass of FIG. 1 for explaining the function of the first embodiment.
Figure 5:
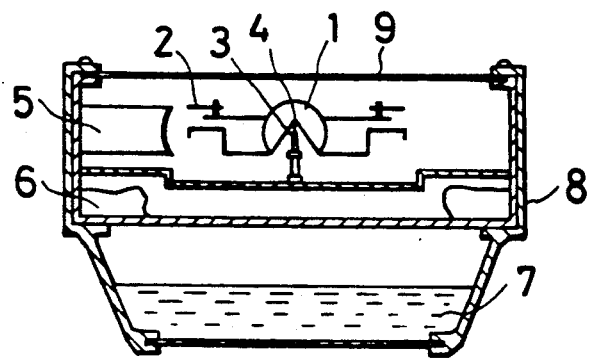
FIG. 5 is a cross-sectional elevation view of a conventional liquid type magnetic compass.

As can be seen from FIG. 4, an upper end of the inner cylinder 13 is slightly expanded or diverged outward to be more or less parallel with the peripheral surface of the bottom 53 of the semispherical float body 10. The air current blown upward, as shown by arrows, lifts the float body slightly, and the air flows along the surface of the round-shaped bottom 53 of the float body 10 and runs out through a clearance between said diverged portion of the upper end of inner cylinder 13 and the float body. The air which has flowed out is then exhausted outside the instrument body 56 through numerous exhaust holes (not shown) in the cover 19 and the upper part of the wall of the outer cylinder 18.

If the upward pressure produced by the air is too low to overcome the weight of the float body 10, there is a possibility that the float body 10 will contact the upper end of the inner cylinder 13 and its ability to respond to the geomagnetism is impaired. Also, if the air current produces a pressure which is excessively higher than that needed to overcome the weight of the float body 10, the float body may touch the cover 19 and lose its stability. Accordingly, the capacity of the electric fan 15 should always be regulated properly to produce a flow of air such that the float body 10 will float so that it is only slightly spaced from the upper end of inner cylinder 13. Numeral 16 designates a power supply plug for the electric fan 15.

An annular plate 22 having a center hole larger in diameter than the flat upper portion 55 of the float body 10 is mounted on an angle bracket 24 which is fixed on the inner surface of the outer cylinder 18 of the instrument body 56. On the plate 22 is the lubber's line 23. The lubber's line 23 is immovable relative to the instrument body, while the azimuth scale of the compass card 12 is designed to be movable to indicate the geomagnetic North direction.

Figure 2:
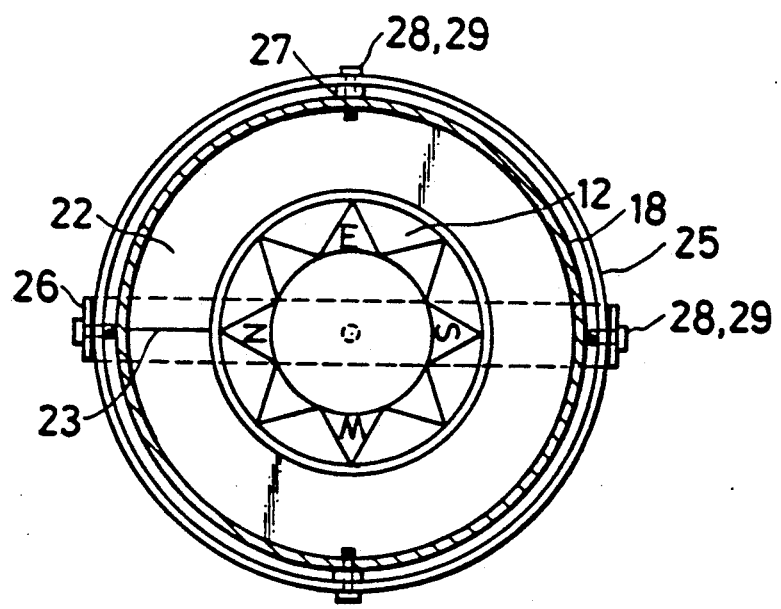
FIG. 2 is a cross-sectional plan view of the magnetic compass taken on the line A—A of FIG. 1.
Figure 3:
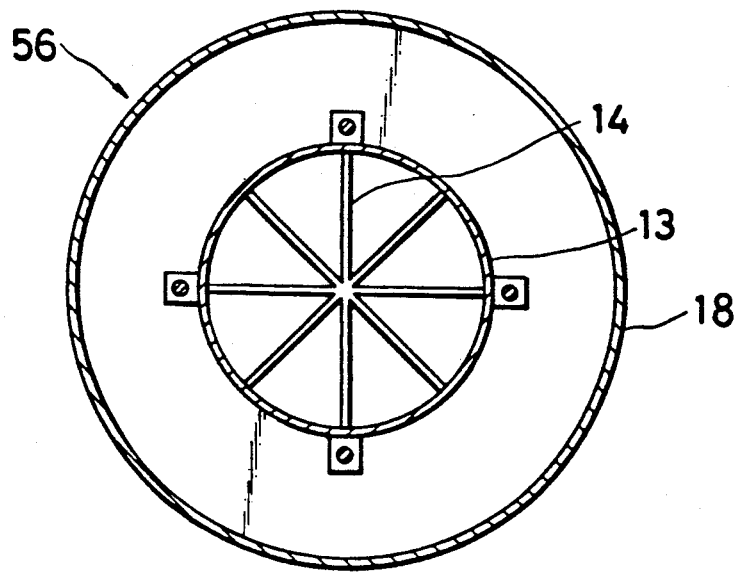
FIG. 3 is a cross-sectional view of the cylindrical instrument body taken on line B—B of FIG. 1.

The instrument body 56 is held by means of a known gimbal mechanism having a structure as shown in FIGS. 1 and 2. The outer cylinder 18 of the instrument body 56 is supported at its front and rear portions so as to be freely inclinable leftward and rightward by a circular gimbal ring 25, cylindrical spacers 27, pins 28 and split pins 29. The gimbal ring 25 is attached at its left and right portions to gimbal plates 26 so as to be freely inclinable fore and aft by pins 28 and split pins 29. The gimbal plates 26 are installed on the left and right sides and fixed to a hull or like appropriate portion of the vessel or the like.

The aforementioned electric fan 15 which is mounted on the lower center portion of the instrument body 56 also acts as a balance weight thereon. The instrument body 56 can therefore always be kept in an upright position by the gimbal mechanism which is freely inclinable fore and aft as well as leftward and rightward against the pitching and rolling of the vessel. The float body 10, as noted above, is floated in an upright position, so that the compass card 12 on the flat upper portion 55 will always be maintained level. This greatly facilitates the observation of azimuth.

It should be noted that the main components of the magnetic compass of the present invention are comprised of non-magnetic materials such as, e.g., synthetic resin, aluminum or the like so as to prevent the magnetic compass from being influenced by magnetism other than geomagnetism which may cause an indication error to occur in the instrument.

Second Embodiment

Figure 6:
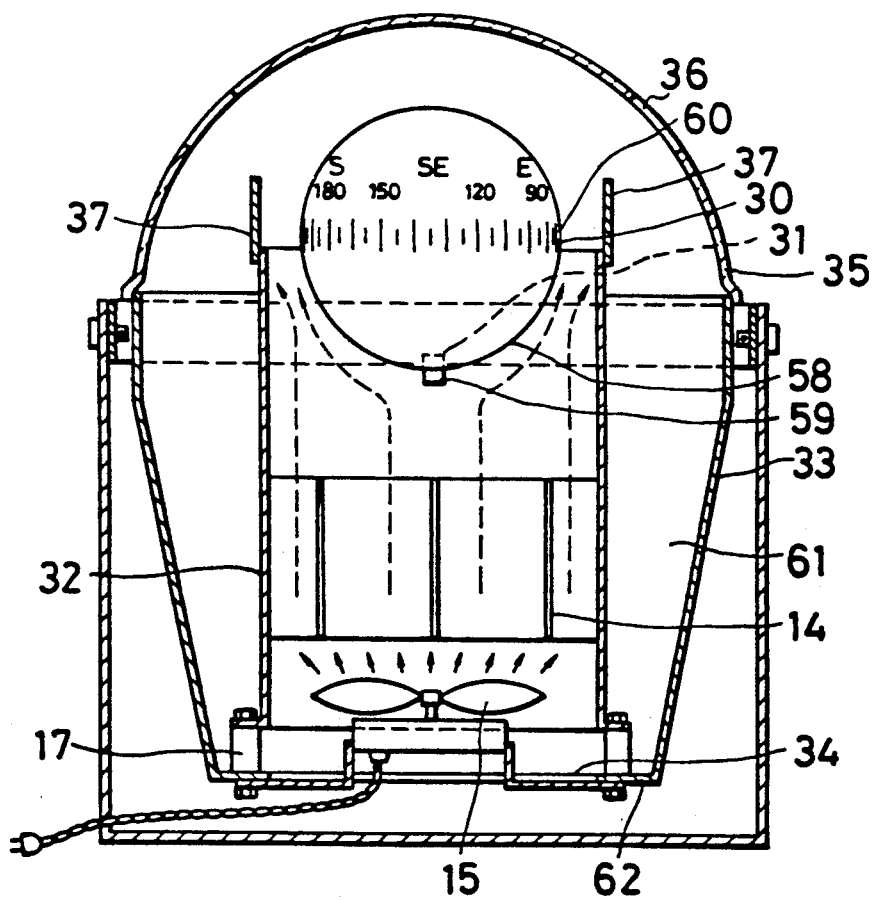
FIG. 6 is a cross-sectional elevation view of a magnetic compass according to a second embodiment of the present invention.
Figure 7:
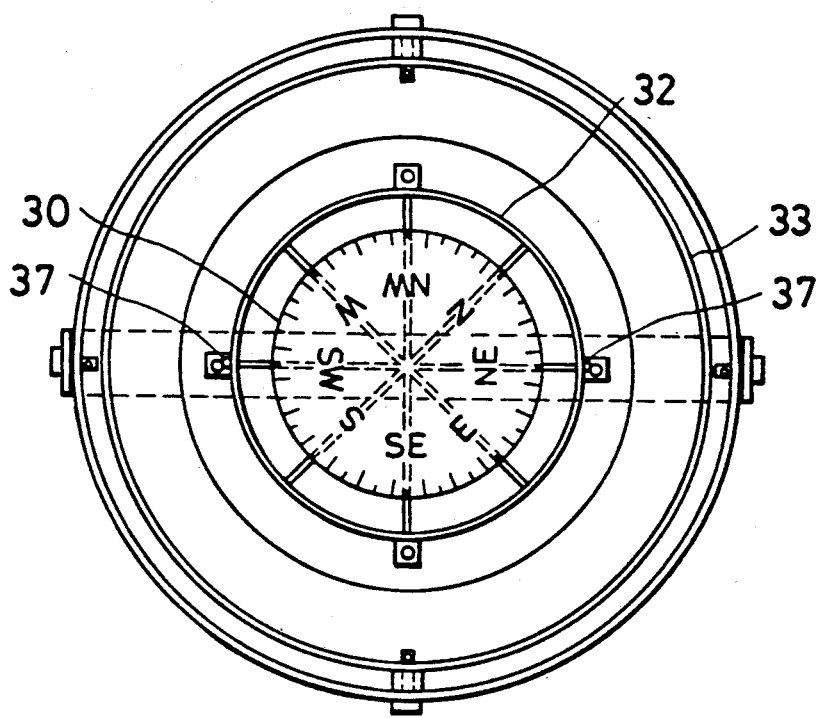
FIG. 7 is a plan view of the magnetic compass of FIG. 6 from which a hood has been removed.

The magnetic compass of the second embodiment is shown in FIGS. 6 and 7. While a semispherical float body is employed in the first embodiment, a spherical float body is employed in the second embodiment. Otherwise, its structural and functional features are the same as those of the first embodiment.

Reference numeral 30 designates a spherical float body made of a lightweight material (e.g. foamed polyethylene), and it is preferable to make it a hollow body. At a bottom center 59 of the spherical bottom surface 58 of the float body 30 is mounted a magnet 31 which causes the center of gravity of the float body to be lowered and brought near the bottom center 59 of the float body. An azimuth scale 60 is provided on the outer circumference of the spherical surface of the float body 30 about midway of the length of a vertical diameter. Reference numeral 61 designates a cylindrical instrument body which is tapered at its lower portion and has an inner cylinder 32 inside thereof, a tapered outer cylinder 33 outside the inner cylinder, and a bottom plate 62 having a hole 34 at its center portion. Numeral 35 designates a semispherical, colorless and transparent hood which is detachably mounted on the outer cylinder 33. The spherical float body 30 can be seen through the hood. Numeral 36 designates a plurality of exhaust holes in the hood 35.

On the bottom plate 62 are provided four supporting rods 17 as in the first embodiment, and the inner cylinder 32 is mounted on the supporting rods 17 so that its central vertical axis coincides with the central vertical axis of instrument body 61. A pair of lubber's line rods 37 are attached to the upper end of inner cylinder 32 on diametrically opposite sides of float body 30. The lubber's line rods 37 constitute a marker for reading the azimuth scale 60 on the outer circumference of the spherical float body 30.

The inner cylinder 32 differs in appearance from the inner cylinder 13 in the first embodiment in that it has a straight cylindrical shape. The inner cylinder 32 is relatively large in diameter so that the spherical float body 30 can float freely therein.

In the same way as in the first embodiment, an electric fan 15 is mounted over a hole 34 and blows an air current upward through the inside of inner cylinder 32. Inside the inner cylinder 32 is an air rectifying means 14 which rectifies turbulent air flow generated by the electric fan 15 and to change it to a parallel current flow so as to cause the spherical float body 30 to float stably on the inner cylinder 13 and out of contact therewith. The spherical float body 30 will always be floated on the inner cylinder 32 with the magnet side down because the magnet 31 is attached to the bottom center 59 of the float body 30, and will also turn to follow the geomagnetic North direction with a good response. The instrument body 61 is always held in an upright position by a gimbal mechanism the same as that in the first embodiment and its components are likewise of non-magnetic materials.

Third Embodiment

Figure 8:
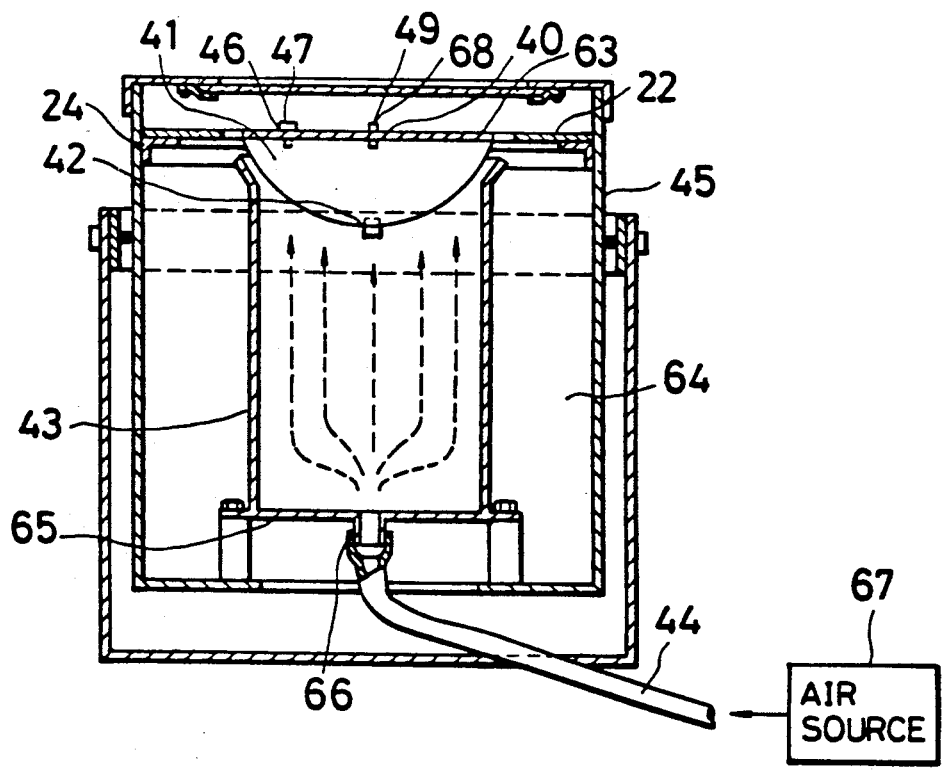
FIG. 8 is a cross-sectional elevation view of a magnetic compass according to a third embodiment of the present invention.
Figure 9:
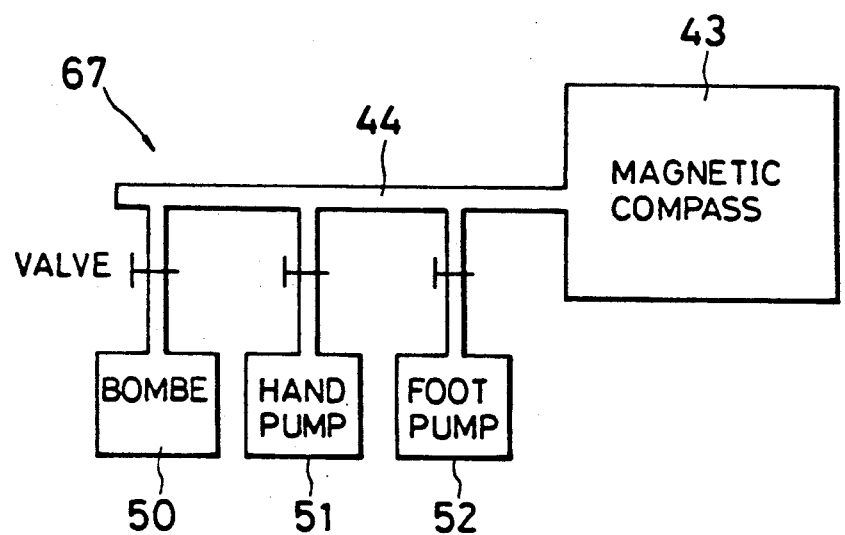
FIG. 9 is a block diagram of an outside air source of the magnetic compass of FIG. 8.

The magnetic compass shown in FIGS. 8 and 9 includes the features of the third embodiment of the invention. Instead of the electric fan 15 employed in the first and second embodiments, a non-turbulent air current is fed through a flexible tube 44 from an outside air current source 67.

Although the third embodiment shows a semispherical float body 41, it will be apparent to one of ordinary skill in the art that it is possible to apply this floating system to a spherical float body 30 such as that shown in the second embodiment.

The cylindrical instrument body 64 having an inner cylinder 43, outer cylinder 45 and bottom plate 65 is substantially identical with the cylindrical instrument body 56 of the first embodiment, except that the electric fan 15 and rectifier 14 inside the inner cylinder 43 are omitted and instead a bottom plate 65 is airtightly mounted inside the inner cylinder 43 and an air supply port 66 is formed at the center of the bottom plate 65. To this air supply port 66 is connected a flexible tube 44, and the air current is fed into the inner cylinder 43 therethrough from an outside air source 67, e.g. a valved pressurized body of air 50, a valved hand pump 51 or a valved foot pump 52.

Although several examples of air source 67 are shown in FIG. 9, the user can adopt any one of them or any equivalent means for the instrument. Using this arrangement, the air current inside the inner cylinder 43 will act to stably float the semispherical float body 41 because a non-turbulent air flow is fed from the outside air source 67 and also the air supply port 66 is formed at the center of the bottom plate.

If an air rectifying means 14 as used in the first embodiment is employed inside the inner cylinder 43, the parallel flow of the supply of air will further be ensured. Also, when using the air supply 50 for this instrument, long periods of use will be assured even for a small capacity air supply because it is used only while the azimuth measurement is being carried out.

The structure in the third embodiment is very effective when an electric source is unavailable.

Fourth Embodiment

Figure 10:
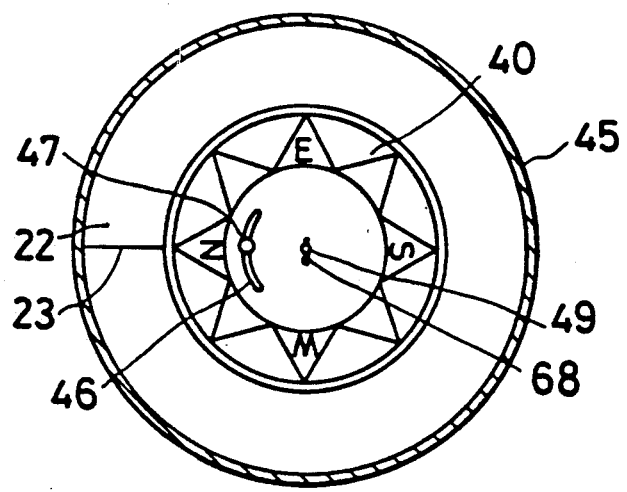
FIG. 10 is a plan view of a variation correcting device for the azimuth scale.

FIGS. 8 and 10 also show a magnetic compass including the features of the fourth embodiment, wherein the semispherical float body 41 is provided with a variation correcting device for correcting the azimuth scale. A small-sized pin 49 is fixed on the center of the upper flat portion 63 of the semispherical float body, and a compass card 40 with a graduated azimuth scale thereon is freely pivoted on the pin 49. Reference numeral 68 designates a cotter pin for preventing the compass card from falling off the pin 49, numeral 46 designates a circular arc groove formed in said compass card 40, and numeral 47 designates a set screw for fixing the compass card 40 on the flat upper portion 63.

From the nature of geomagnetism, it is inevitable that certain variations are created between the azimuth scale and the direction which magnet 42 in response to the geomagnetism depending upon the vessel's or user's position. However, this variation can be easily corrected by turning the compass card 40 gently clockwise or counterclockwise and tightening the set screw 47 to fix the compass card 40 securely onto the upper flat portion 63. In this way, a highly accurate azimuth measurement will be possible.

The variation correcting device of the fourth embodiment cannot be applied to the spherical float body 30 of the second embodiment because the two have different structures of the azimuth scale.

Several preferred embodiments of the present invention have been described above with reference to the relevant drawings. As can be understood from this description, the semispherical o spherical float body with the graduated azimuth scale thereon is floated stably and out of contact therewith by the parallel air current blown upward through the inside of the inner cylinder, so that a smooth turning motion of the float body is ensured. Accordingly, the float body can turn with good response to the geomagnetism and indicate direction. This enables the magnetic compass of the present invention to accurately indicate the azimuth.

The electric fan is a very simple air current source. However, it is not possible to use it to float the float body stably without an additional device because the electric fan generates a turbulent air flow. Therefore, the present invention provides a simple air rectifying means in the structure, thereby making it possible to supply rectified parallel air flow into the inner cylinder.

The semispherical or spherical float body is provided with a magnet at the bottom center thereof, so that the magnet acts as a balance weight on the float body while it is floating and enables the float body to always float in an upright position with the magnet attached to the bottom center.

The instrument body is supported by a gimbal mechanism, so that it is always held in an upright position. On the other hand, the float body is also floated in an upright position on the upper portion of the instrument body, so that the azimuth scale on the float body is always kept level. This facilitates the measurement of the azimuth.

Even in a case where it is impossible to use an electric fan because an electric source is unavailable, this invention makes it possible to use the instrument by utilizing an outside air source such as a pressurized supply of air or the like.

The variation between the azimuth scale and the correct geomagnetic direction can easily be corrected by merely turning the compass card, so that a highly accurate measurement can be assured.

The magnetic compass according to this invention is an improvement over the prior art in such points as followability, ease of operation, lighter weight and moderate price, so that it is suitable for use on a small motor boat, yacht, etc.

While the present invention has been described as above, it can be summarized as in the claims which define the scope of the invention.

What is claimed is:

1. A magnetic compass comprising:
    an instrument body adapted to be held level by a Gimabl mechanism and having a vertical cylinder member;
    a spherical or semi-spherical float body on the upper end of said cylinder member and having a spherical surface facing downwardly into the upper end of said cylinder member;
    a magnet means at a bottom center of said float body for making the center of gravity of said float body near the bottom center of the float body;
    a graduated azimuth scale on said float body;
    a lubber's line indicating means on the surface of said instrument body surrounding said float body; and
    an air blowing means operatively associated with said cylinder member for blowing rectified air upward through the inside of said cylinder member with a force sufficient for making the float body float stably on the upper end of said cylinder member and out of contact therewith for enabling the float body to freely turn in response to geomagnetic force.

2. A magnetic compass as claimed in claim 1 in which said air blowing means comprises an electric fan in a lower portion of said cylinder member and an air rectifying means for rectifying a turbulent air flow generated by said electric fan in the cylinder member above said fan for making the air current flowing upward through the cylinder member a smoothly flowing parallel flow.

3. A magnetic compass as claimed in claim 1 in which said air blowing means is an outside air source supplying air into the inside of said cylinder member in a smoothly flowing parallel flow.

4. A magnetic compass as claimed in claim 3 in which said air blowing means is a supply of pressurized air.

5. A magnetic compass as claimed in claim 3 in which said air blowing means is a hand pump.

6. A magnetic compass as claimed in claim 3 in which said air blowing means is a foot pump.

7. A magnetic compass as claimed in claim 3 in which said air blowing means further comprises an air rectifying means inside the cylinder member.

8. A magnetic compass as claimed in claim 1 in which the upper end of said cylinder member is diverged outwardly for causing an air current to flow easily and smoothly along the float body surface between the float body and the upper end of said cylinder member.

9. A magnetic compass as claimed in claim 1 wherein said float body is a semi-spherical float body, and said azimuth scale comprises a card having an azimuth scale thereon and mounted on said float body, and said magnetic compass further comprises a variation correcting means for correcting a variation between the position of the azimuth scale on said float body and the direction of the magnet in the geomagnetic force.

* * * * *